(12) United States Patent
Park et al.

(10) Patent No.: US 9,118,091 B2
(45) Date of Patent: Aug. 25, 2015

(54) SECONDARY BATTERY

(75) Inventors: Junpyo Park, Yongin-si (KR); Kiwoon Kim, Yongin-si (KR); Seokjoon Yoon, Yongin-si (KR); Youngju Ahn, Yongin-si (KR); Chanho Lee, Yongin-si (KR); Jinho Lee, Yongin-si (KR); Kwangsik Jeon, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 821 days.

(21) Appl. No.: 13/415,992

(22) Filed: Mar. 9, 2012

(65) Prior Publication Data

US 2012/0258340 A1   Oct. 11, 2012

Related U.S. Application Data

(60) Provisional application No. 61/471,947, filed on Apr. 5, 2011.

(51) Int. Cl.
*H01M 2/04* (2006.01)
*H01M 2/26* (2006.01)
*H01M 2/30* (2006.01)
*H01M 10/42* (2006.01)
*H01M 10/48* (2006.01)
*H01M 10/44* (2006.01)

(52) U.S. Cl.
CPC ............ *H01M 10/44* (2013.01); *H01M 2/0469* (2013.01); *H01M 2/0473* (2013.01); *H01M 2/266* (2013.01); *H01M 2/30* (2013.01); *H01M 10/42* (2013.01); *H01M 10/425* (2013.01); *H01M 10/4257* (2013.01); *H01M 10/445* (2013.01); *H01M 10/48* (2013.01); *H01M 2/263* (2013.01); *H01M 2010/4271* (2013.01); *H01M 2200/00* (2013.01); *H01M 2220/20* (2013.01)

(58) Field of Classification Search
CPC ................... H01M 2010/42; H01M 2010/425; H01M 2010/4271; H01M 2/0473; H01M 2/0469; H01M 2/263; H01M 2/266; H01M 2/30; H01M 10/42; H01M 10/425; H01M 10/4257; H01M 10/48; H01M 10/44; H01M 10/445
See application file for complete search history.

(56) References Cited

U.S. PATENT DOCUMENTS

| | | |
|---|---|---|
| 2003/0027036 A1 | 2/2003 | Emori et al. |
| 2003/0151868 A1 | 8/2003 | Inae et al. |
| 2007/0122691 A1 | 5/2007 | Lee et al. |

FOREIGN PATENT DOCUMENTS

| | | |
|---|---|---|
| JP | 11-040203 | 2/1999 |
| JP | 2003-223886 | 8/2003 |
| KR | 10-2001-0011900 A | 2/2001 |

*Primary Examiner* — Eugenia Wang
(74) *Attorney, Agent, or Firm* — Lee & Morse, P.C.

(57) ABSTRACT

A battery may include a short circuit member connected to a terminal having a first polarity and a deformable conductive member having a second polarity, the deformable conductive member being insulated from the short circuit member, the deformable conductive member being configured to contact the short circuit member when a voltage applied thereto exceeds a predetermined voltage.

21 Claims, 5 Drawing Sheets

SECONDARY BATTERY

CROSS-REFERENCE TO RELATED APPLICATION

The present application claims priority under 35 U.S.C. §119(e) to U.S. Provisional Application No. 61/471,947, filed on Apr. 5, 2011, and entitled: "Secondary Battery," which is incorporated herein by reference in its entirety.

BACKGROUND

1. Field

Embodiments relate to a secondary battery.

2. Description of the Related Art

Unlike primary batteries, secondary batteries are rechargeable. Among such secondary batteries, a low capacity battery including a battery cell in the form of a pack may be used for small portable electronic devices, e.g., cellular phones and camcorders, and a high capacity battery including dozens of battery cells connected to one another may be used as a motor-driving power source, e.g., for electric scooters, hybrid vehicles, or electric vehicles.

Secondary batteries are manufactured in various shapes such as a cylindrical shape and a prismatic shape. A secondary battery is typically constructed as follows: an electrode assembly formed by disposing an insulating separator between positive and negative electrode plates is placed in a case together with electrolyte; and a cap plate is disposed on the case. The electrode assembly is connected to positive and negative terminals which protrude from the cap plate and are exposed to the exterior of the secondary battery.

SUMMARY

Embodiments are direct to a battery. The battery may include a short circuit member connected to a terminal having a first polarity, and a deformable conductive member having a second polarity, the deformable conductive member being insulated from the short circuit member, the deformable conductive member being configured to contact the short circuit member when a voltage applied thereto exceeds a predetermined voltage.

The deformable conductive member may be configured to contact the short circuit member when pressure in the battery exceeds a predetermined pressure.

The battery may include a case having the first polarity and an opening in the case, wherein the deformable conductive member is in the opening.

The short circuit member may extend over the opening.

The deformable conductive member may be electrically coupled to the case, the deformable conductive member being configured to contact the short circuit member when a voltage at the terminal exceeds a predetermined voltage.

The deformable conductive member may include a conductive reversible part mounted in the opening, and a piezoelectric element in contact with the conductive reversible part, the piezoelectric element receiving the voltage applied to the deformable conductive member.

The battery may include a constraining part configured to concentrate deformation of the piezoelectric element on where the piezoelectric element contacts the conductive reversible part.

The battery may include a support member adjacent an inner surface of the case and under the opening, the piezoelectric element being supported by the support member.

The support member may include first and second vertical members extending from an inner surface of the case and on either side of the opening, and a horizontal member connecting the first and second vertical members and supporting the piezoelectric element.

The piezoelectric element may contact one of the first and second vertical members.

The piezoelectric element may contact both of the first and second vertical members.

The support member may include a pressure inlet hole in communication with the case, the conductive reversible part being configured to contact the short circuit member when a pressure inside the case exceeds a predetermined pressure.

The conductive reversible part may seal the opening, the conductive reversible part being configured to contact the short circuit member when a pressure inside the case exceeds a predetermined pressure.

The battery may include a detection unit configured to detect the voltage applied to the second electrode terminal, the voltage supply line connecting the detection unit and the piezoelectric element.

The detection unit may include a sensor part configured to output a sensed voltage proportional to the voltage applied to the second electrode terminal, and a control part configured to compare the sensed voltage to a reference voltage and to output the predetermined voltage to the voltage supply line when the sensed voltage exceeds the reference voltage.

The sensor part may include a voltage divider and the sensed voltage is a fraction of the voltage applied to the second electrode terminal.

The sensor part may include a voltage sensor configured to measure the voltage applied to the second electrode terminal and output the sensed voltage at a level in response thereto.

The voltage supply line may directly connect the second electrode terminal to the piezoelectric element.

The conductive reversible part may include a central reversible part extending down away from the short circuit member when the voltage supplied to the piezoelectric element is less than the predetermined voltage.

The central reversible part may be inwardly convex toward the electrode assembly when the voltage supplied to the piezoelectric element is less than the predetermined voltage.

Embodiments are directed to a secondary battery. The secondary battery may include a case having a first polarity, an electrode assembly in the case, an electrode terminal electrically connected to the electrode assembly, the electrode terminal having a second polarity, a short circuit member electrically coupled to the electrode terminal, and a deformable conductive member electrically coupled to the case and being configured to contact the short circuit member when a voltage supplied thereto exceeds a predetermined voltage.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Hereinafter, embodiments will be described in detail with reference to the accompanying drawings.

Figure 1:
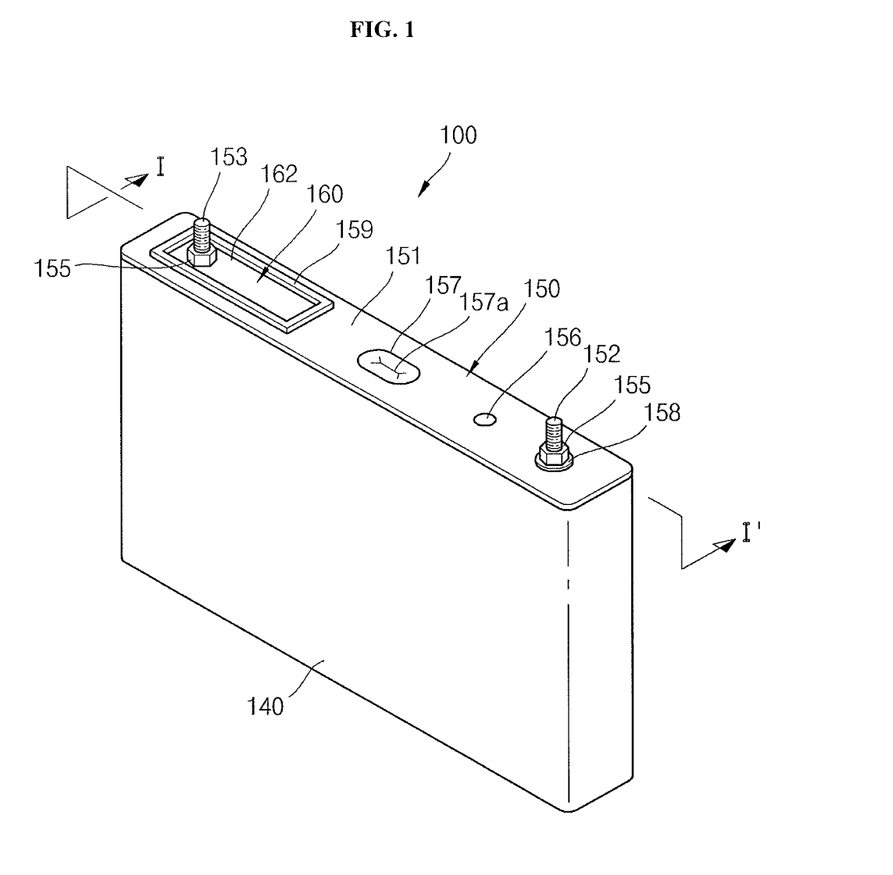
FIG. 1 illustrates a perspective view of a secondary battery according to an embodiment.
Figure 2:
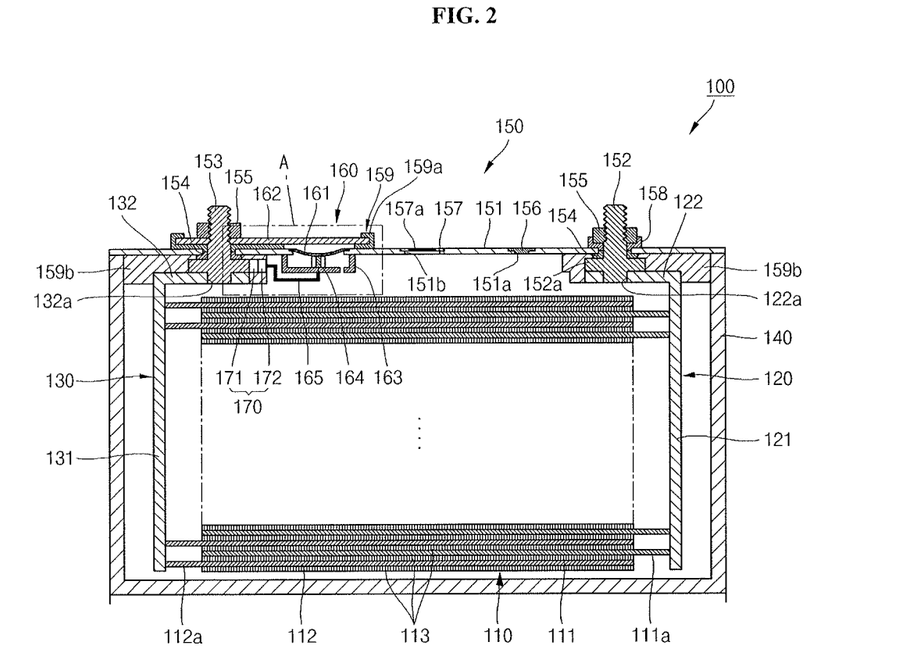
FIG. 2 illustrates a sectional view of the secondary battery taken along line I-I' of FIG. 1.
Figure 3:
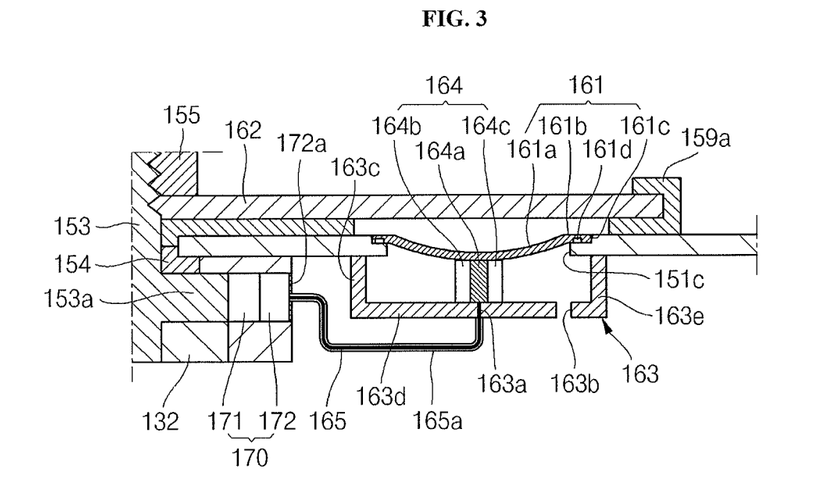
FIG. 3 illustrates an enlarged view of portion A of FIG. 2.

FIG. 1 illustrates a perspective view of a secondary battery 100 according to an embodiment. FIG. 2 illustrates a sectional view of the secondary battery 100 taken along line I-I' of FIG. 1. FIG. 3 illustrates an enlarged view of portion A of FIG. 2.

Referring to FIGS. 1 through 3, the secondary battery 100 of the current embodiment includes an electrode assembly 110, a first collecting plate 120, a second collecting plate 130, a case 140, a cap assembly 150, and a short-circuit member 160.

The electrode assembly 110 may be a roll or stack type electrode assembly formed by winding or stacking a first electrode plate 111, a separator 113, and a second electrode plate 112, which have a thin plate or film shape. The separator 113 is disposed between the first electrode plate 111 and the second electrode plate 112. The first electrode plate 111 may function as a positive electrode and the second electrode plate 112 may function as a negative electrode, or vice versa.

The first electrode plate 111 may be formed by applying a first electrode active material, e.g., a transition metal oxide, on a first electrode collector formed of metal foil, e.g., aluminum foil. The first electrode plate 111 may include a first electrode non-coating portion 111a on which the first electrode active metal is not applied. The first electrode non-coating portion 111a functions as a current flow passage between the first electrode plate 111 and the outside of the first electrode plate 111.

The second electrode plate 112 may be formed by applying a second electrode active material, e.g., graphite or carbon, to a second electrode collector formed of metal foil, e.g., nickel or copper foil. The second electrode plate 112 may include a second electrode non-coating portion 112a to which the second electrode active metal is not applied. The second electrode non-coating portion 112a functions as a current flow passage between the second electrode plate 112 and outside the second electrode plate 112.

The separator 113 is disposed between the first electrode plate 111 and the second electrode plate 112 to prevent an electric short circuit, while allowing movement of lithium ions. The separator 113 may be formed of e.g., a poly ethylene film, a poly propylene film, or a film including poly ethylene and poly propylene.

The first collecting plate 120 is formed of a conductive material, e.g., aluminum. The first collecting plate 120 makes contact with the first electrode non-coating portion 111a protruding from a lateral end of the electrode assembly 110 for electric connection with the first electrode plate 111. The first collecting plate 120 may include a coupling part 121 and a bent part 122.

The coupling part 121 may have a plate shape and makes contact with the first electrode non-coating portion 111a. The coupling part 121 is electrically connected to the first electrode non-coating portion 111a so that the first electrode non-coating portion 111a can be electrically connected to an outside area through the coupling part 121.

The bent part 122 may have a plate shape bent from the coupling part 121 at an angle of about 90°. The bent part 122 may be disposed between an upper part of the electrode assembly 110 and the cap assembly 150. The bent part 122 may include a terminal hole 122a. The terminal hole 122a may be formed through a side of the bent part 122 and a first electrode terminal 152 of the cap assembly 150 may be coupled to the terminal hole 122a.

The second collecting plate 130 is formed of a conductive material, e.g., nickel. The second collecting plate 130 makes contact with the second electrode non-coating portion 112a protruding from the other lateral end of the electrode assembly 110 for electric connection with the second electrode plate 112. The second collecting plate 130 may include a coupling part 131 and a bent part 132. The bent part 132 may include a terminal hole 132a for coupling with a second electrode terminal 153.

The coupling part 131, the bent part 132, and the terminal hole 132a of the second collecting plate 130 have the same structures and functions as the coupling part 121, the bent part 122, and the terminal hole 122a of the first collecting plate 120. Thus, descriptions thereof will not be repeated.

The case 140 is formed of a conductive metal, e.g., aluminum, aluminum alloy, or steel plated with nickel. The case 140 may have an approximately hexahedral shape with an opening so that the electrode assembly 110, the first collecting plate 120, and the second collecting plate 130 can be inserted and placed in the case 140.

Referring to FIG. 2, the case 140 and the cap assembly 150 are coupled to each other, and the opening of the case 140 is not shown. However, a peripheral part of the cap assembly 150 may substantially correspond to the opening of the case 140. The inner surface of the case 140 is treated to be electrically insulated from the electrode assembly 110, the first collecting plate 120, the second collecting plate 130, and the cap assembly 150. The case 140 may have a polarity. For example, the case 140 may function as a positive electrode.

The cap assembly 150 is coupled to the case 140. In detail, the cap assembly 150 may include a cap plate 151, the first electrode terminal 152, the second electrode terminal 153, gaskets 154, and fixing parts 155. The cap assembly 150 may further include a plug 156, a vent plate 157, a connection plate 158, and an insulation member 159.

The cap plate 151 may be used to close the opening of the case 140. The cap plate 151 may be formed of the same material as that used to form the case 140. The cap plate 151 may include an electrolyte injection hole 151a, a vent hole 151b, and a short-circuit hole 151e (refer to FIG. 3).

The first electrode terminal 152 may be inserted through the cap plate 151 and may be electrically connected to the first collecting plate 120. The first electrode terminal 152 may have a pillar shape, and the outer surface of an upper pillar-part of the first electrode terminal 152 protruding upward from the cap plate 151 may be threaded. A flange 152a may be formed on a lower-pillar part of the first electrode terminal 152 disposed under the cap plate 151 so that the first electrode terminal 152 may not be pulled out from the cap plate 151. A part of the first electrode terminal 152 lower than the flange 152a is inserted in the terminal hole 122a of the first collecting plate 120. The first electrode terminal 152 may be electrically connected to the cap plate 151 through the connection plate 158.

The second electrode terminal 153 may be inserted through the cap plate 151, spaced from where the first electrode terminal 152 is inserted, and may be electrically connected to the second collecting plate 130. The second electrode terminal 153 has the same structure as the first electrode terminal 152. Thus, a detailed description thereof will not be repeated. Unlike the first electrode terminal 152, the second electrode terminal 153 is insulated from the cap plate 151.

The second electrode terminal 153 may include a detection unit 170 configured to detect a voltage of the second electrode terminal 153. The detection unit 170 may be disposed at a side of a lower insulation member 159b disposed between the second collecting plate 130 and the cap plate 151 in a state where the detection unit 170 is connected to a flange 153a of the second electrode terminal 153. The detection unit 170 detects a voltage applied to the second electrode terminal 153 and transmits a corresponding voltage to a piezoelectric element 164a (described later).

The detection unit 170 may include a sensor part 171 and a control part 172. The sensor part 171 outputs a fraction of a voltage applied to the second electrode terminal 153. The sensor part 171 may be a voltage divider circuit (refer to FIG. 9) for obtaining a fraction of a voltage applied to the second electrode terminal 153. Alternatively, the sensor part 171 may be a voltage sensor configured to measure a voltage applied to the second electrode terminal 153 and output a predetermined voltage level in response to the measured voltage. In this way, the sensor part 171 outputs a fraction voltage to the control part 172.

The control part 172 compares the voltage received from the sensor part 171 with a reference voltage. If the voltage is greater than the reference voltage, the control part 172 may transmit a predetermined voltage to the piezoelectric element 164a to deform the piezoelectric element 164a. The predetermined voltage may be a driving voltage necessary to deform the piezoelectric element 164a. For this, the control part 172 may be a control circuit (refer to FIG. 9) having a transistor, or the control part 172 may be an integrated circuit (IC) chip including the control circuit. The control part 172 may be electrically connected to the piezoelectric element 164a through a voltage supply line 165. The control part 172 and the sensor part 171 may receive a driving voltage through the first electrode terminal 152 and the second electrode terminal 153.

The control part 172 and the voltage supply line 165 may be overlaid with protective layers 172a and 165a so as to prevent the outer surfaces of the control part 172 and the voltage supply line 165 from making contact with the electrolyte. The protective layers 172a and 165a may be formed of a material that has high heat resistance, strength, and electrical insulating properties and does not react with the electrolyte. For example, the protective layers 172a and 165a may be formed of, e.g., at least one of polyamide, poly phenylene sulfide resin, polyethylene, and polypropylene.

The gaskets 154 may include an insulation material and may be disposed between the cap plate 151 and each of the first and second electrode terminals 152 and 153. The gaskets 154 seal gaps between the cap plate 151 and the first and second electrode terminals 152 and 153. The gaskets 154 prevent permeation of moisture into the secondary battery 100 and/or leakage of the electrolyte from the secondary battery 100.

The fixing parts 155 may be coupled to threaded parts of the first and second electrode terminals 152 and 153 for fixing the first and second electrode terminals 152 and 153 to the cap plate 151.

The plug 156 seals the electrolyte injection hole 151a of the cap plate 151. The vent plate 157 is disposed in the vent hole 151b and may include a notch 157a so that the vent plate 157 can be opened at a preset pressure.

The connection plate 158 may be disposed between the first electrode terminal 152 and the cap plate 151 to receive the first electrode terminal 152. The connection plate 158 may be adhered closely to the cap plate 151 and the gaskets 154 using the fixing part 155. The connection plate 158 electrically connects the first electrode terminal 152 and the cap plate 151.

The insulation member 159 may include an upper insulation member 159a and lower insulation members 159b. The upper insulation member 159a may be disposed between the second electrode terminal 153 and the cap plate 151 to receive the second electrode terminal 153. The upper insulation member 159a may be adhered closely to the cap plate 151 and the gaskets 154. The upper insulation member 159a may insulate the second electrode terminal 153 from the cap plate 151. The lower insulation members 159b may be disposed between the cap plate 151 and the first and second collecting plates 120 and 130 so as to prevent a short circuit.

The short-circuit member 160 may be disposed at upper and lower sides of the cap plate 151. The short-circuit member 160 may include a first short-circuit member 161, a second short-circuit member 162, and a support member 163.

The first short-circuit member 161 is electrically connected to the cap plate 151. When the detection unit 170 applies a voltage to the piezoelectric element 164a, the first short-circuit member 161 is reversed into an upwardly convex shape so that the first short-circuit member 161 can be connected to the second short-circuit member 162. The first short-circuit member 161 may be formed of, e.g., aluminum. The first short-circuit member 161 may be a reversible plate including a reversible part 161a having a downwardly convex shape and an edge part 161b fixed to the periphery of the short-circuit hole 151c.

The reversible part 161a is convex toward the inside of the case 140. In detail, the reversible part 161a is convex toward the inside of the support member 163. The reversible part 161a has a shape corresponding to the short-circuit hole 151c of the cap plate 151, and the short-circuit hole 151c is sealed by the reversible part 161a. The reversible part 161a has a predetermined elasticity so that the reversible part 161a can be reversed when the detection unit 170 applies a voltage to the piezoelectric element 164a or the inside pressure of the case 140 increases.

In a normal state, the reversible part 161a is electrically connected to the cap plate 151 and electrically disconnected from the second short-circuit member 162. However, if the reversible part 161a is reversed, the top side of the reversible part 161a comes into contact with the second short-circuit member 162 so that the cap plate 151 and the second short-circuit member 162 can be electrically connected to each other. Since the cap plate 151 is connected to the first electrode terminal 152 (positive pole) and the second short-circuit member 162 is connected to the second electrode terminal 153 (negative pole), if the reversible part 161a is reversed, the first and second electrode terminals 152 and 153 are electrically short-circuited. Then, energy of the secondary battery 100 is consumed and the secondary battery 100 can reach a stable state without the possibility of overcharge.

The edge part 161b may include a welding part 161c at a side adjoining the cap plate 151. The welding part 161c may be formed by pulse welding. Alternatively, the welding part 161c may be formed more securely by continuous welding. The welding part 161c may be formed by performing a welding process from an upper part of a lateral boundary between the cap plate 151 and the edge part 161b.

The edge part 161b may include a notch 161d in its bottom side making contact with the cap plate 151. Due to the notch 161d, a smaller area of the bottom side of the edge part 161b makes contact with the cap plate 151. This increases the flexibility of the reversible part 161a when the reversible part 161a is reversed.

The second short-circuit member 162 may be coupled to the second electrode terminal 153 at a position spaced apart from the outside of the cap plate 151. The second short-circuit member 162 may extend over the short-circuit hole 151c. The second short-circuit member 162 is electrically connected to the second electrode terminal 153. The second short-circuit member 162 may have planar top and bottom surfaces and may be formed of copper.

The support member 163 may be formed of an insulation material. The support member 163 may be shaped to cover the first short-circuit member 161. A piezoelectric unit 164 may be disposed in the support member 163. The support member 163 may include a first vertical member 163c, a second vertical member 163e, and a horizontal member 163d connecting the first and second vertical members 163c and 163d. The first and second vertical members 163c and 163e are disposed on the bottom surface of the cap plate 151 at both sides of the short-circuit hole 151c and extend toward the inside of the case 140. The reversible part 161a and the piezoelectric unit 164 are disposed in a space formed by the first vertical member 163c, the second vertical member 163e, and the horizontal member 163d.

The piezoelectric unit 164 may include the piezoelectric element 164a and first and second support parts 164b and 164c. The piezoelectric element 164a is formed of a material that deforms in response to an electric signal. The first and second support parts 164b and 164c may be disposed at both sides of the piezoelectric element 164a to support the piezoelectric element 164a. Therefore, the piezoelectric element 164a can be deformed only in a vertical direction because the first and second support parts 164b and 164c support, i.e., constrain, the left and right sides (first and second regions) of the piezoelectric element 164a.

Upper and lower metal electrodes (not shown) may be disposed on the top and bottom surfaces of the piezoelectric element 164a. The upper metal electrode is connected to the first short-circuit member 161 and the lower metal electrode is connected to the voltage supply line 165. The upper metal electrode may have the same polarity (for example, positive polarity) as the first short-circuit member 161, and the lower metal electrode may have the same polarity (for example, negative polarity) as the second electrode terminal 153 connected to the voltage supply line 165.

The horizontal member 163d may include a line penetration hole 163a and a pressure inlet hole 163b. The voltage supply line 165 is inserted in the line penetration hole 163a to electrically connect the detection unit 170 and the piezoelectric element 164a. The piezoelectric element 164a is disposed on the top surface of the horizontal member 163d in a manner such that the top surface of the piezoelectric element 164a is in contact with a convex portion of the reversible part 161a. That is, an end of the piezoelectric element 164a is in contact with the reversible part 161a, and the other end of the piezoelectric element 164a is electrically connected to the control part 172 of the detection unit 170 through the voltage supply line 165 inserted through the line penetration hole 163a. The inside pressure of the case 140 is applied through the pressure inlet hole 163b. Due to the pressure inlet hole 163b, if the inside pressure of the case 140 increases higher than a preset reference value, the reversible part 161a can be reversed by the increased inside pressure of the case 140.

Therefore, according to the current embodiment, if an overvoltage is applied to the first and second electrode terminals 152 and 153 of the secondary battery 100, although a reaction does not occur in the case 140, the reversible part 161a can be reversed by the piezoelectric element 164a to cause a short circuit between the first and second electrode terminals 152 and 153. In addition, if the inside pressure of the case 140 increases higher than a preset reference value due to a reaction in the case 140, the reversible part 161a can be reversed although the piezoelectric element 164a does not operate.

If the voltage of the second electrode terminal 153 applied to the sensor part 171 of the detection unit 170 is greater than a reference voltage, the control part 172 connected to the sensor part 171 transmits the voltage to the piezoelectric element 164a to deform the piezoelectric element 164a. Then, if the reversible part 161a is reversed by the deformed piezoelectric element 164a, the top side of the reversible part 161a is brought into contact with the second short-circuit member 162. Thus the cap plate 151 and the second short-circuit member 162 are electrically connected to each other. Therefore, if the reversible part 161a is reversed, the first electrode terminal 152 and the second electrode terminal 153 are electrically short circuited. Therefore, due to the short circuit between the first electrode terminal 152 and the second electrode terminal 153, a charging operation of the secondary battery 100 can be terminated, and a charged voltage can be decreased. Therefore, the secondary battery 100 of the current embodiment can be protected.

That is, according to the current embodiment, since a voltage applied to the terminals 152 and 153 of the secondary battery 100 can be transmitted to the piezoelectric element 164a to deform the piezoelectric element 164a to cause a short circuit, overcharging of the secondary battery 100 can be prevented, and the secondary battery 100 can be used more safely.

Hereinafter, various modification embodiments of the short-circuit member 160 (refer to region A in FIG. 1) of the secondary battery 100 will be described. In the following description, descriptions of elements having the same structures and functions as those of the previous embodiment, such as the electrode assembly 110, the first electrode plate 111, the second electrode plate 112, the case 140, and the cap assembly 150, will not be repeated for conciseness.

Figure 4:
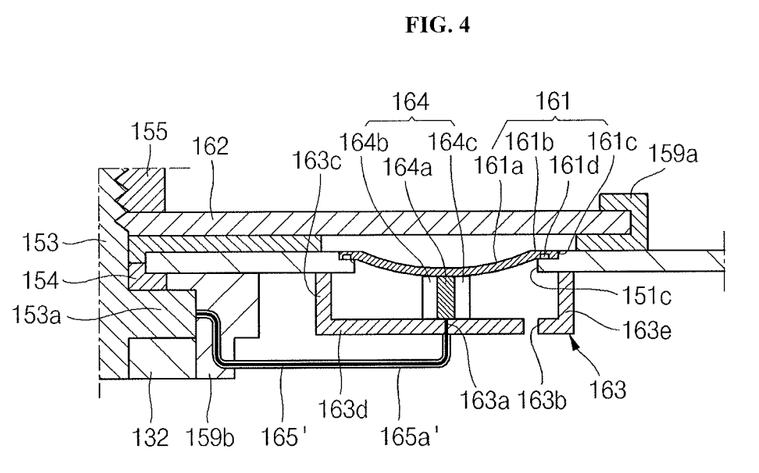
FIG. 4 illustrates a sectional view of a short-circuit member of a secondary battery according to another embodiment.

FIG. 4 illustrates a sectional view of a short-circuit member of a secondary battery according to another embodiment. Elements having the same structures and functions as those of the elements of the previous embodiment are denoted by the same reference numerals and different features will now be mainly described.

Referring to FIG. 4, in the secondary battery of the current embodiment, the flange 153a of the second electrode terminal 153 is directly connected to a support member 163 through a voltage supply line 165'. That is, since the second electrode terminal 153 and the support member 163 are connected to each other through the voltage supply line 165', a voltage applied to the second electrode terminal 153 is directly transmitted to the support member 163. Therefore, a voltage applied to the second electrode terminal 153 is transmitted to a piezoelectric element 164a through the voltage supply line 165' inserted in the line penetration hole 163a of the support member 163, and the piezoelectric element 164a is deformed by the voltage.

The piezoelectric element 164a may be designed be deformed when a voltage equal to or greater than a predetermined voltage is applied. That is, if a voltage transmitted from the second electrode terminal 153 is equal to or greater than the predetermined voltage, the piezoelectric element 164a is deformed. First and second support parts 164b and 164c are disposed at left and right sides (first and second regions) of the piezoelectric element 164a to support, i.e., constrain, the piezoelectric element 164a and allow deformation of the piezoelectric element 164a only in a vertical direction.

Therefore, in the secondary battery of the current embodiment, a voltage applied to the second electrode terminal 153 is directly transmitted to the piezoelectric element 164a to reverse the reversible part 161a. In other words, the detection unit 170 of FIGS. 2 and 3 may be omitted. Then, the second short-circuit member 162 and a cap plate 151 are electrically connected to each other to cause a short circuit.

Figure 5:
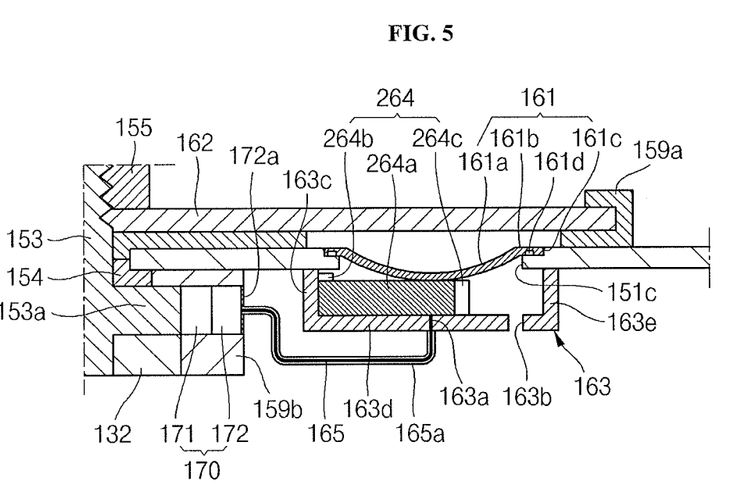
FIG. 5 illustrates a sectional view of a short-circuit member of a secondary battery according to another embodiment.

FIG. 5 illustrates a sectional view of a short-circuit member of a secondary battery according to another embodiment.

Referring to FIG. 5, the secondary battery of the current embodiment includes a piezoelectric unit 264 modified from the piezoelectric unit 164 of FIG. 3. In the piezoelectric unit 264, a left end (first region) of a piezoelectric element 264a is fixed to the first vertical member 163c of the support member 163; a first support part 264b supports an upper region of the piezoelectric element 264a and may be secured to the first vertical member 163c; and a second support part 264c supports a right end of the piezoelectric element 264a. As the first support part 264b constrains vertical movement of the piezoelectric element 264a in a region peripheral to where the piezoelectric element 364a contacts the reversible part 161a, and the second support part 264c and the first vertical member 163c constrain lateral movement of the piezoelectric element 264a, substantially only a region of the piezoelectric element 264a making contact with a reversible part 261a is vertically deformed. As the region of the piezoelectric element 264a making contact with the reversible part 161a is deformed upward to reverse the reversible part 161a, the cap plate 151 and the second short-circuit member 162 are electrically connected to each other to cause a short circuit.

Figure 6:
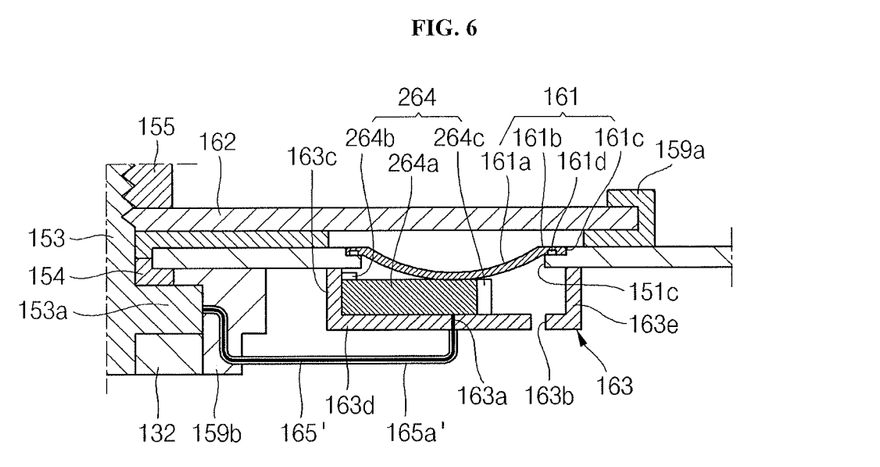
FIG. 6 illustrates a sectional view of a short-circuit member of a secondary battery according to another embodiment.

FIG. 6 illustrates a sectional view of a short-circuit member of a secondary battery according to another embodiment. Elements having the same structures and functions as those of the elements of the embodiment explained with reference to previous embodiments are denoted by the same reference numerals and different features will now be mainly described.

Referring to FIG. 6, the secondary battery of the current embodiment does not include the detection unit 170. Instead, the second electrode terminal 153 and the piezoelectric element 264a are electrically connected directly through a voltage supply line 165'. Therefore, a voltage applied to the second electrode terminal 153 is transmitted to the piezoelectric element 264a through the voltage supply line 165' inserted through the line penetration hole 163a of the support member 163. Thus, the piezoelectric element 264a is deformed by the voltage.

Therefore, in the secondary battery of the current embodiment, a voltage applied to the second electrode terminal 153 is directly transmitted to the piezoelectric element 264a, and then a region of the piezoelectric element 264a making contact with the reversible part 161a is deformed upward to reverse the reversible part 161a. As a result, the cap plate 151 and the second short-circuit member 162 are electrically connected to each other to cause a short circuit.

Figure 7:
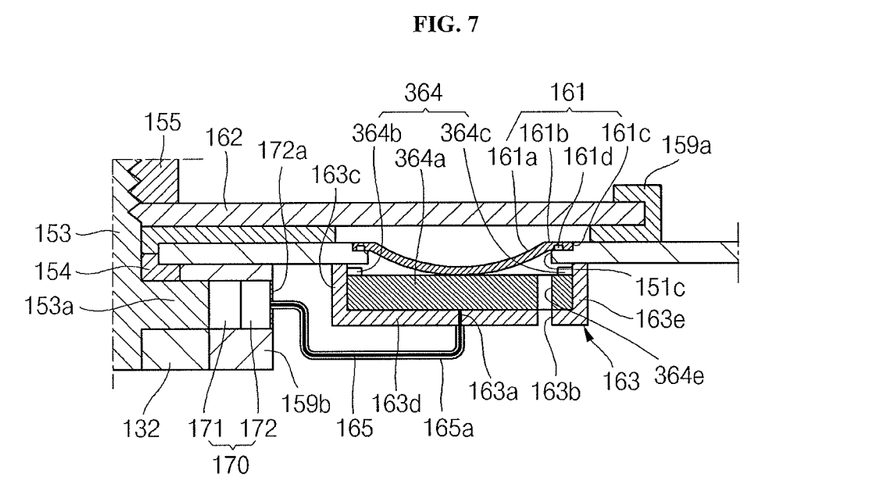
FIG. 7 illustrates a sectional view of a short-circuit member of a secondary battery according to another embodiment.

FIG. 7 illustrates a sectional view of a short-circuit member of a secondary battery according to another embodiment.

Referring to FIG. 7, the secondary battery of the current embodiment includes a piezoelectric unit 364 modified from the piezoelectric unit 164 of FIG. 3. In the piezoelectric unit 364, both lateral ends of a piezoelectric element 364a are fixed to first and second vertical members 363c and 363e, while the pressure inlet hole 163b extends through the piezoelectric element 364a. Further, topsides of the lateral ends of the piezoelectric element 364a are supported by first and second support parts 364b and 364c, i.e., in regions peripheral to where the piezoelectric element 364a contacts the reversible part 161a. Thus, the piezoelectric element 364a is adapted such that only a center region of the piezoelectric element 364a making contact with a reversible part 361a is deformed.

In the secondary battery of the current embodiment, a voltage applied to the second electrode terminal 153 is transmitted to the piezoelectric element 364a through the detection unit 170, and then the center region of the piezoelectric element 364a making contact with the reversible part 161a is deformed upward to reverse the reversible part 161a. As a result, the cap plate 151 and the second short-circuit member 162 are electrically connected to each other to cause a short circuit.

Figure 8:
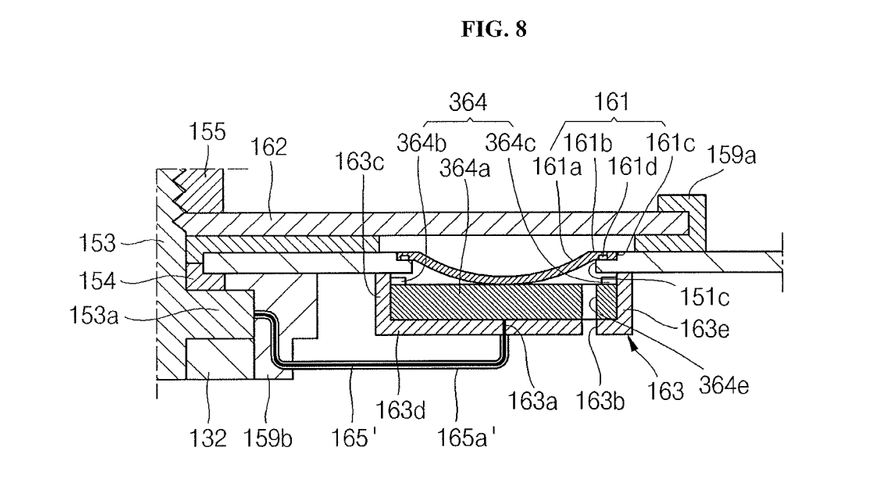
FIG. 8 illustrates a sectional view of a short-circuit member of a secondary battery according to another embodiment.

FIG. 8 illustrates a sectional view of a short-circuit member of a secondary battery according to another embodiment. Elements having the same structures and functions as those of the elements of the embodiment explained with reference to FIG. 7 are denoted by the same reference numerals and different features will now be mainly described.

Referring to FIG. 8, the secondary battery of the current embodiment does not include the detection unit 170. Instead, the second electrode terminal 153 and the support member 163 are electrically connected directly through the voltage supply line 165'. Therefore, a voltage applied to the second electrode terminal 153 is transmitted to the piezoelectric element 364a through the voltage supply line 165' inserted through the line penetration hole 163a of the support member 163. Thus, the piezoelectric element 364a is deformed by the voltage.

In the secondary battery of the current embodiment, a voltage applied to the second electrode terminal 153 is transmitted directly to the piezoelectric element 364a, and then a center region of the piezoelectric element 164a making contact with the reversible part 161a is deformed upward to reverse the reversible part 161a. As a result, the cap plate 151 and the second short-circuit member 162 are electrically connected to each other to cause a short circuit.

Figure 9:
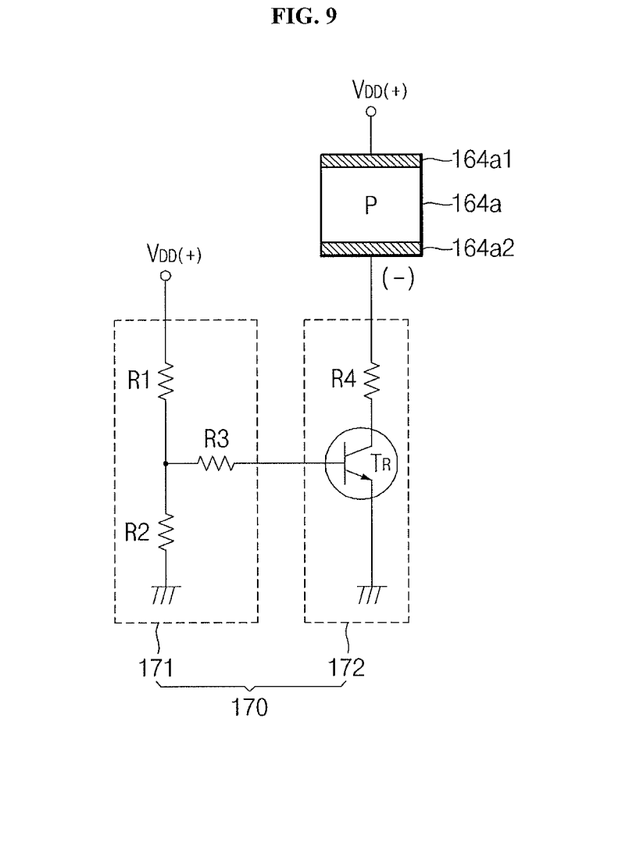
FIG. 9 illustrates a circuit diagram of a detection unit of a secondary battery according to an embodiment.

FIG. 9 illustrates a circuit diagram of the detection unit 170 of a secondary battery according to an embodiment. FIG. 9 illustrates examples of the sensor parts and the control parts of the detection units of FIGS. 3, 5, and 7. Descriptions of the same elements as those shown in FIGS. 3, 5, and 7 will not repeated for conciseness.

Referring to FIG. 9, in the detection unit 170 of the current embodiment, the sensor part 171 may be a voltage divider circuit and the control part 172 may be a control circuit 172.

A first end of the voltage divider circuit 171 may be connected to a cap plate (refer to the cap plate 151 of FIG. 2) and a second end of the voltage divider circuit 171 may be connected (grounded) to a second electrode terminal (refer to the second electrode terminal 153 of FIG. 2). The voltage divider circuit 171 may include a first resistor R1, a second resistor R2, and a third resistor R3. The first resistor R1 and the second resistor R2 are connected in series to each other, and the third resistor R3 is connected between the control circuit 172 and a junction of the first and second resistors R1 and R2. The first and second resistors R1 and R2 are used to obtain a fraction of a voltage VDD applied to the second electrode terminal, and the third resistor R3 is used to adjust the voltage fraction and apply the adjusted voltage fraction to the control circuit 172.

The control circuit 172 may include a transistor TR and a fourth resistor R4. A first end of the fourth resistor R4 may be connected to a piezoelectric element 164*a* and second end of the fourth resistor R4 may be connected to a collector of the transistor TR. A base of the transistor TR may be connected to the third resistor R3 of the voltage divider circuit 171 and an emitter of the transistor TR may be connected (grounded) to the second electrode terminal. The transistor TR of the control circuit 172 may be, e.g., a NPN transistor. If a voltage from the third resistor R3 increases, a predetermined voltage is generated by a switching operation (turning-on) of the transistor TR and is applied to the piezoelectric element 164*a*. For example, a voltage applied to the base of the transistor TR is higher than a preset voltage, for example, 0.6 V, the transistor TR is turned on, and a predetermined voltage is applied to the piezoelectric element 164*a*. That is, if a voltage equal to or lower than the preset voltage is applied to the transistor TR, the transistor TR is turned off, and if a voltage higher than the preset voltage is applied to the transistor TR, the transistor TR is turned on. At this time, the preset voltage may be a driving voltage necessary to deform the piezoelectric element 164*a*. The piezoelectric element 164*a* includes metal electrodes 164*a*1 and 164*a*2. The metal electrodes 164*a*1 and 164*a*2 have different polarities and are disposed on both sides of the piezoelectric element 164*a*. One of the metal electrodes 164*a*1 is connected to the cap plate (i.e., VDD), and the other of the metal electrodes 164*a*2 is connected to the fourth resistor R4.

In the secondary battery of the current embodiment, a voltage applied to the electrode terminal is divided by the sensor part 171 (voltage divider circuit) to obtain a fraction voltage, and the fraction voltage is applied to the base of the transistor TR of the control part 172 (control circuit). If the fraction voltage is greater than a preset voltage, the transistor TR is switched on to supply a predetermined voltage to the piezoelectric element 164*a*, and then the piezoelectric element 164*a* is deformed by the predetermined voltage.

By way of summary and review, embodiments may provide a battery in which a short circuit can be induced according to a voltage applied to a terminal so as to prevent overcharge. In particular, when a terminal voltage exceeds an overcharge voltage, a deformable conductive member may be deformed to provide the short circuit. In addition, embodiments may provide a battery having a deformable element that can be deformed to cause a short circuit although the inside pressure of the case is not increased, so as to prevent overcharge.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery, comprising:
   a short circuit member connected to a first electrode terminal having a first polarity; and
   a deformable conductive member having a second polarity, the deformable conductive member being insulated from the short circuit member, the deformable conductive member being configured to contact the short circuit member when a voltage applied thereto exceeds a predetermined voltage.

2. The battery as claimed in claim 1, wherein the deformable conductive member is configured to contact the short circuit member when pressure in the battery exceeds a predetermined pressure.

3. The battery as claimed in claim 1, further comprising:
   a case having the first polarity; and
   an opening in the case, wherein the deformable conductive member is in the opening.

4. The battery as claimed in claim 3, wherein the short circuit member extends over the opening.

5. The battery as claimed in claim 3, wherein the deformable conductive member is electrically coupled to the case, the deformable conductive member being configured to contact the short circuit member when a voltage at the first electrode terminal exceeds the predetermined voltage.

6. The battery as claimed in claim 3, wherein the deformable conductive member comprises:
   a conductive reversible part mounted in the opening; and
   a piezoelectric element in contact with the conductive reversible part, the piezoelectric element receiving the voltage applied to the deformable conductive member.

7. The battery as claimed in claim 6, further comprising a constraining part configured to concentrate deformation of the piezoelectric element on where the piezoelectric element contacts the conductive reversible part.

8. The battery as claimed in claim 6, further comprising a support member adjacent an inner surface of the case and under the opening, the piezoelectric element being supported by the support member.

9. The battery as claimed in claim 8, wherein the support member comprises:
   first and second vertical members extending from an inner surface of the case and on either side of the opening; and
   a horizontal member connecting the first and second vertical members and supporting the piezoelectric element.

10. The battery as claimed in claim 9, wherein the piezoelectric element contacts one of the first and second vertical members.

11. The battery as claimed in claim 10, wherein the piezoelectric element contacts both of the first and second vertical members.

12. The battery as claimed in claim 9, wherein the support member includes a pressure inlet hole in communication with the case, the conductive reversible part being configured to contact the short circuit member when a pressure inside the case exceeds a predetermined pressure.

13. The battery as claimed in claim 6, wherein the conductive reversible part seals the opening, the conductive reversible part being configured to contact the short circuit member when a pressure inside the case exceeds a predetermined pressure.

14. The battery as claimed in claim 6, further comprising:
   a detection unit configured to detect the voltage applied to a second electrode terminal, a voltage supply line connecting the detection unit and the piezoelectric element.

15. The battery as claimed in claim 14, wherein the detection unit includes:

a sensor part configured to output a sensed voltage proportional to a voltage applied to the second electrode terminal; and a control part configured to compare the sensed voltage to a reference voltage and to output the predetermined voltage to the voltage supply line when the sensed voltage exceeds the reference voltage.

16. The battery as claimed in claim 15, wherein the sensor part includes a voltage divider and the sensed voltage is a fraction of the voltage applied to the second electrode terminal.

17. The battery as claimed in claim 15, wherein in the sensor part includes a voltage sensor configured to measure the voltage applied to the second electrode terminal and output the sensed voltage at a level in response thereto.

18. The battery as claimed in claim 6, wherein a voltage supply line directly connects a second electrode terminal to the piezoelectric element.

19. The battery as claimed in claim 6, wherein the conductive reversible part includes a central reversible part extending down away from the short circuit member when the voltage received by the piezoelectric element is less than the predetermined voltage.

20. The battery as claimed in claim 19, wherein the central reversible part is inwardly convex toward the electrode assembly when the voltage received by the piezoelectric element is less than the predetermined voltage.

21. A secondary battery, comprising:

a case having a first polarity;

an electrode assembly in the case;

an electrode terminal electrically connected to the electrode assembly, the electrode terminal having a second polarity;

a short circuit member electrically coupled to the electrode terminal; and a deformable conductive member electrically coupled to the case and being configured to contact the short circuit member when a voltage supplied thereto exceeds a predetermined voltage.

* * * * *